United States Patent [19]

Inoue

[11] Patent Number: 4,606,007
[45] Date of Patent: Aug. 12, 1986

[54] NC ELECTROEROSION METHOD AND APPARATUS

[75] Inventor: Kiyoshi Inoue, Tokyo, Japan

[73] Assignee: Inoue-Japax Research Incorporated, Kanagawaken, Japan

[21] Appl. No.: 482,155

[22] Filed: Apr. 5, 1983

[51] Int. Cl.$^4$ .......................... G06F 15/46; B23P 1/08
[52] U.S. Cl. .................................. 364/474; 219/69 M; 219/69 G; 318/592; 364/167; 364/182
[58] Field of Search ................................ 364/167–171, 364/474, 475, 180, 182; 219/68, 69 R, 69 C, 69 G, 69 M; 204/129.1, 129.2; 318/592, 594, 595

[56] References Cited

U.S. PATENT DOCUMENTS

| | | | |
|---|---|---|---|
| 3,849,624 | 11/1974 | Dulebohn et al. | 219/69 G X |
| 3,975,607 | 8/1976 | Ullmann et al. | 219/69 M |
| 3,975,608 | 8/1976 | Ullmann et al. | 219/69 G X |
| 4,370,537 | 1/1983 | Oizumi et al. | 219/69 G X |
| 4,425,492 | 1/1984 | Wyss | 219/69 M |
| 4,431,897 | 2/1984 | Ito | 219/69 G |

Primary Examiner—Joseph Ruggiero
Attorney, Agent, or Firm—Karl F. Ross; Herbert Dubno

[57] ABSTRACT

An NC-EDM method and apparatus wherein a succession of electrical discharges is effected across an EDM gap to effect electroerosive stock removal from the workpiece while the tool electrode is consecutively advanced relatively into the workpiece under NC commands which in a prescribed set define a desired path and extent of the relative advancement. Control is effected to act on the EDM power supply for maintaining parameters of the electrical discharges in a given EDM mode during an initial period of the consecutive advancement of the tool electrode relative to the workpiece. The arrival of the tool electrode at a predetermined position relative to the workpiece spaced by a preselected distance from its final position which is determined by the said extent of the consecutive relative advancement is sensed for switching the parameters of the electrical discharges into another EDM mode and maintaining the switched parameters until the tool electrode reaches the said final position relative to the workpiece.

10 Claims, 2 Drawing Figures

NC ELECTROEROSION METHOD AND APPARATUS

FIELD OF THE INVENTION

The present invention relates to the electroerosion arts and, more particularly, to a numerically controlled (NC) electroerosion method of and apparatus for machining an electrically conductive workpiece with a tool electrode, wherein a succession of electrical discharges is effected across an electrical discharge machining (EDM) gap formed between the tool electrode and the workpiece to electroerosively remove material from the workpiece while the tool electrode is successively advanced relatively into the workpiece under NC commands which in a prescribed set define a desired path and extent of the relative advance.

BACKGROUND OF THE INVENTION

The NC electroerosion or EDM process may be carried out in various modes which are generally classified depending upon specific patterns of the relative advancement of the tool electrode into the workpiece.

In the sinking-type NC EDM mode, the tool electrode may be advanced axially or in a given direction coaxial to or in parallel with a tool supporting spindle carrying the tool electrode, relatively into the workpiece throughout the machining operation. When the tool electrode reaches a given depth of sinking, forming a cavity in the workpiece, the linear relative advance may be halted. It has been found to be desirable to move the tool electrode which has reached such a depth, in a given orbital path relative to the workpiece to thoroughly finish the surfaces of the previously rough-machined cavity in the workpiece. In a scanning-type process with a "generic" electrode which is simple in a cross-sectional shape, i.e. a cross section generally independent of the shape of the desired cavity or contour, the tool electrode is advanced relative to the workpiece in a programmed three-dimensional path which determines the desired machining shape.

Irrespective of particular patterns of relative advance between the tool electrode and the workpiece, the NC control process has the advantage that a displacement from one given position to another successively in the path is achieved in a digital manner or in multiple steps of an identical small, predetermined increment, say, of 1 μm. In this manner, the distance of relative travel can be accurately given by the number of such incremental steps and an overtravel which is often encountered with analog or continuous advancement can effectively be prevented. For example, in the orbiting system, the radius of orbit is incrementally altered or advanced over successive orbital movements while machining electrical discharges are permitted to occur with their parameters held in a given EDM mode until an ultimate orbiting radius is reached. Likewise, in the straight-line and scanning type processes, the tool electrode is advanced incrementally relative to the workpiece while discharges are permitted to occur with their parameters held in a predetermined setting until a final relative position is achieved. It has been found, however, that these conventional techniques are inefficient or otherwise give rise to unsatisfactory machining finish.

OBJECT OF THE INVENTION

It is accordingly an important object of the present invention to provide a new and improved NC-EDM or -electroerosion method which enables a machining operation which is highly efficient and affords improved machining accuracy and finish.

SUMMARY OF THE INVENTION

According to the present invention there is provided in a first aspect thereof a numerically controlled (NC) electroerosion method of machining an electrically conductive workpiece with a tool electrode, which method comprises the steps of: (a) effecting a succession of electrical discharges across an electrical discharge machining (EDM) gap between the tool electrode and the workpiece to electroerosively remove material from the workpiece while consecutively advancing the tool electrode relatively into the workpiece under NC commands which in a prescribed set define a desired path and extent of the relative advance; (b) maintaining parameters of said electrical discharges in a given EDM mode during an initial period of the consecutive advance of the tool electrode relative to the workpiece; (c) in response to arrival of the tool electrode at a predetermined position relative to the workpiece spaced by a preselected distance from its final position determined by said extent of the consecutive relative advance, switching the parameters of the electrical discharges into another EDM mode; and (d) maintaining said switched parameters until said tool electrode reaches said final position relative to said workpiece.

Specifically, in step (c), the parameters of electrical discharges may be switched in response to the NC commands representing said arrival. The said given mode may be a roughing EDM mode and the said another mode may be a finishing EDM mode.

The method may further comprise switching the said parameters to establish a medium EDM mode upon arrival of the tool electrode at a predetermined position spaced by a preselected distance from the first-mentioned predetermined position relative to the workpiece and maintaining the established EDM mode until the tool electrode reaches the first-mentioned predetermined position relative to the workpiece.

The method may also comprise further changing the said parameters to progressively establish successive EDM modes from the first-mentioned EDM mode to the second-mentioned EDM mode as a function of the relative position of the tool electrode to the workpiece intermediate between the said initial period and arrival of the tool electrode at the said predetermined position during the said consecutive relative advancement.

The said parameters may include at least one of the pulse interval between successive electrical discharges and the pulse duration and the peak current thereof. The said succession of electrical discharges is generally applied in the form of a succession of time-spaced or intermittently occurring trains of discharge pulses and the said parameters may include at least one of the peak current and duration of the discharge pulses, the time intervals between the successive trains and the duration of the trains. The said set of NC commands may be programmed to execute the said consecutive relative advancement between the tool electrode and the workpiece along a predetermined orbital path extending transversely to the axis of the tool electrode.

The present invention also providees, in a second aspect thereof a numerically controlled (NC) electroerosion apparatus for machining an electrically conductive workpiece with a tool electrode, which apparatus comprises: power supply means for effecting a succession of electrical discharges across an EDM gap between the tool electrode and the workpiece to electroerosively remove material from the workpiece; NC drive means for advancing the tool electrode relatively into the workpiece under NC commands as the material removal proceeds, the said NC commands in a set defining a desired path and extent of the relative advancement; control means associated with the power supply means for maintaining parameters of the electrical discharges in a given EDM mode during an initial period of the consecutive advancement of the tool electrode relative to the workpiece; means responsive to arrival of the tool electrode at a predetermined position relative to the workpiece spaced by a preselected distance from its final position determined by the said extent of the consecutive relative advancement for switching the parameters of the electrical discharges into another EDM mode and maintaining the switched parameters until the tool electrode reaches the said final position relative to the workpiece. The lastmentioned means may be associated with the said NC drive means to respond to the NC commands representing the said arrival.

BRIEF DESCRIPTION OF THE DRAWING

These and other features of the present invention as well as advantages thereof will become more readily apparent from a reading of the following description of certain embodiments thereof when taken with reference to the accompanying drawing in which.

SPECIFIC DESCRIPTION

Figure 1:
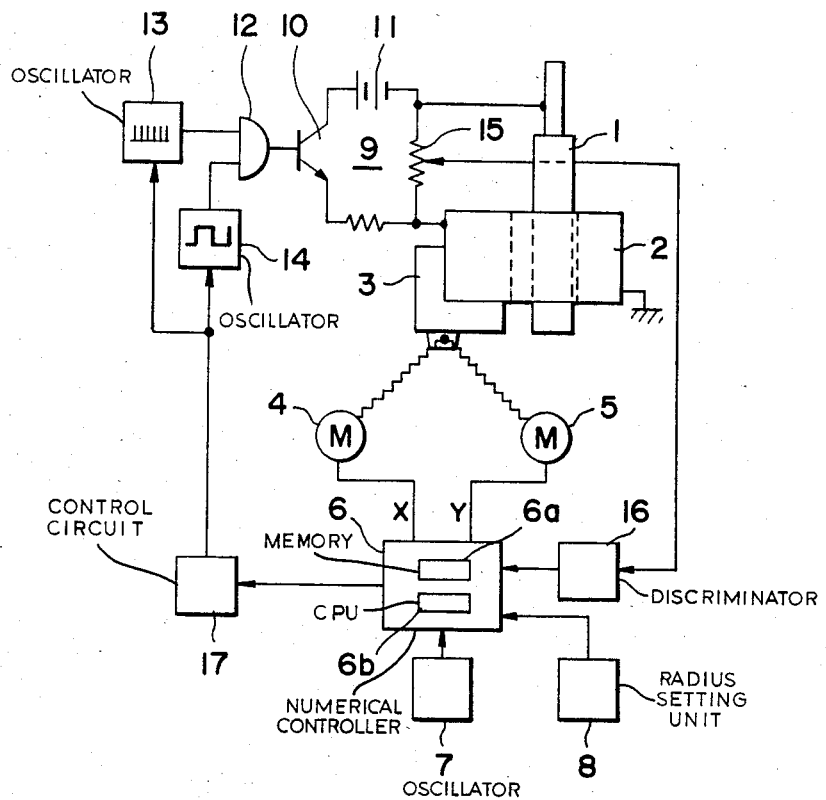
FIG. 1 is a schematic view diagrammatically illustrating an EDM system embodying the present invention.
Figure 2:
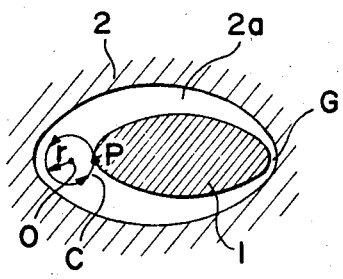
FIG. 2 is a cross-sectional view diagrammatically illustrating a tool electrode being orbited in a cavity in the workpiece for machining the wall of the cavity.

Referring now to the drawing, a tool electrode 1 is complementary in shape with a cavity 2a previously machined in a workpiece 2 and with a desired cavity to be eventually produced therein. As shown the tool electrode 1 is located in the previously machined cavity 2a. The workpiece 2 is securely mounted on a worktable 3 which is displaced by a pair of motors 4 and 5. The motors 4 and 5 are provided to displace the workpiece 2 in the directions of X- and Y-axes, respectively, which are arranged to be mutually orthogonal in a horizontal or X-Y plane. The motors 4 and 5 are driven in response to drive signals furnished from an NC (numerical control) unit 6 to displace the workpiece 2 relative to the tool electrode 1 orbitally or in translation along a predetermined circular path C with a radius r. The relative movement between the tool electrode 1 and the workpiece 2 is such that any given point P on the tool electrode 1 moves along the circle C with the center O and the radius r as shown in FIG. 1.

The NC unit 6 is driven by clock pulses furnished by an oscillator 7 to operate to execute the orbital movement of the tool electrode 1 relative to the workpiece with the radius r which is preset in a setting unit 8.

An EDM power supply as shown at 9 includes a power switch 10 connected in series with a DC source 11 to the tool electrode 1 and the workpiece 2. The switch 10 is turned on and off in response to control output pulses which develop at the output of an AND gate 12. The AND gate 12 has a pair of inputs connected to a first oscillator 13 providing a train of signal pulses of a relatively high frequency and a second oscillator 14 providing a succession of signal pulses of a relatively low frequency, respectively. As a result, a succession of time-spaced or intermittently interrupted trains of machining pulses are applied between the tool electrode 1 and the workpiece 2 to produce a corresponding succession of electrical discharge across a machining gap G whereby to electroerosively remove stock from the workpiece 2.

The gap voltage representing a minimum gap spacing between the tool electrode 1 and the workpiece 2 is detected by a sensing resistor 15 connected across the machining gap G and is discriminated by a threshold circuit 16, e.g. a Schmitt-trigger circuit having a preset gap threshold level. A signal representing an increase of the gap spacing over the preset level is thus applied to the NC unit 6. It will be apparent that this signal develops upon completion of each orbital motion of the tool electrode 1 relative to the workpiece 2. This signal is applied to the NC unit 6 to increase the radius r of the orbital motion by one increment. The NC unit 6 includes a memory 6a having therein stored the desired pattern of the orbital motion and a plurality of desired incremental values of the radius r to repeat the orbital motion while progressively increasing the radius r incrementally. When the final orbital motion of the maximum radius rmax is reached and ascertained to commence by coincidence of the signal from the discriminator 16 and the signals in the memory 6a and the setting unit 8, the central processing unit 6b in the NC unit 6 operates to furnish a trigger signal which is applied to a control circuit 17 associated with one or both of the oscillators 13 and 14 to alter machining pulse conditions previously set for roughing EDM to those for finishing EDM.

The trigger signal may be applied to the oscillator(s) 13, 14 to reduce the duration of each individual machining pulse and/or the duration of each individual train of machining pulses. The trigger signal may also be applied to alter the peak current of each individual machining pulse. To increase the peak current, the power switches may comprise a plurality of parallel-connected switching transistors a portion of which is operated in the roughing EDM step. In the finishing EDM step, the remaining portion of these transistors may be operated as well to increase the peak current of each individual machining pulse.

The machining pulse conditions may be altered in more than two steps, e.g. finishing, medium and roughing EDM steps. Thus, the oscillator 13, 14 may have three sets of the pulse time parameters selectively established. In the initial step, the first set of pulse time parameters may be established to execute roughing EDM. Upon reception of a trigger signal indicating the approach by a given distance of the tool electrode 1 to the final cavity contour to be produced in the workpiece 2, the control circuit 17 operates to switch the first set to the second set of pulse time parameters selected to establish the medium EDM mode. Then the circuit 17 operates to maintain the newly established mode in the oscillator 13, 14 until another trigger signal indicating a further approach of the tool electrode 1 to the said final cavity contour by another given (shorter) distance is received from the central processing unit 6b. The control circuit 17 then operates to establish and maintains the third set of the pulse time parameters selected to execute the finishing EDM mode so that the finished cavity contour eventually assumes the desired contour. The peak current of the machining pulses may be likewise controlled.

In the practice of the present invention, it should be noted that any other suitable orbital path than circular (C) as shown may be employed to displace the tool electrode 1 and the workpiece 2 relative to each other. For example, the tool electrode 1 may initially be positioned to locate itself within and to align its center coaxially with the center of, the previously machined cavity 2a in the workpiece 2. The tool electrode 1 and the workpiece 2 are then displaced relative to each other forth and back by an equal distance successively in a plurality of angularly equi-distantly spaced radial directions. Thus, for examle, the tool electrode 1 may be displaced relative to the workpiece in an orthogonal X-Y coordinate system, first forth and back in the direction of +X by a distance r, second forth and back in the direction of +Y by the distance r, third forth and back in the direction of −X by the distance r and fourth forth and back in the direction of −Y by the distance r. Alternatively, the relative displacement may follow a square path, e.g. first in the direction of +X, second in the direction of +Y, third in the direction of −X and fourth in the direction of −Y, each by an equal distance. Upon completion of each of successive cycles of such programmed orbital displacements the said equal distance is increased by a predetermined increment, this cycle being repeated a predetermined number of times until the machined contour eventually assumes the desired contour.

In the practice of the present invention it should also be apparent that the machining gap G is prferably servocontrolled in response to a gap signal so as to be maintained substantially constant while the relative movement between the tool electrode 1 and the workpiece 2 is being effected along a predetermined orbital path under the control of the NC unit 6. Thus, a servo-control unit (not shown) may respond to a voltage sensed across the machining gap G to compare it with a reference voltage representing an optimum gap spacing and may furnish the NC unit 6 with error signals indicating gap spacing wider and narrower than the optimum spacing. The unit 6 is programmed to act on the oscillator 7 provided at a part thereof to control the rate of the orbital displacement.

What is claimed is:

1. An electroerosion method of machining an electrically conductive workpiece with a tool electrode, the method comprising the steps of:
   (a) effecting a succession of electrical discharges across an electrical discharge machining (EDM) gap between the tool electrode and the workpiece to electroerosively remove material from the workpiece while consecutively advancing the tool electrode relatively into the workpiece under numerical commands from a numerical controller whose commands in a set numerically prescribe a desired path and extent of the relative advancement;
   (b) maintaining electrical parameters of said discharges in a given EDM mode during an initial period of the numerically commanded consecutive advancement of the tool electrode relative to the workpiece;
   (c) sensing, by means of said numerical controller, arrival of the tool electrode at a predetermined position in said path relative to the workpiece spaced by a preselected distance from its final position determined by said numerically prescribed extent of the consecutive relative advancement to provide a signal; and
   (d) in response to said signal, switching the electrical parameters of said discharges into another EDM mode, and maintaining said switched parameters until said tool electrode reaches said final position relative to said workpiece established in said numerical controller.

2. The method defined in claim 1 wherein in step (c), said parameters of electrical discharges are switched in response to the NC commands representing said arrival.

3. The method defined in claim 1 or claim 2 wherein said given mode is a roughing EDM mode and said another mode is a finishing EDM mode.

4. The method defined in claim 3, further comprising switching said parameters to establish a medium EDM mode upon arrival of the tool electrode at a predetermined position spaced by a preselected distance from the first-mentioned predetermined position relative to the workpiece and maintaining the established EDM mode until said tool electrode reaches said first-mentioned predetermined position relative to the workpiece.

5. The method defined in claim 1, further comprising changing said parameters to progressively establish successive EDM modes from the first-mentioned EDM mode to the second-mentioned EDM mode as a function of the relative position of the tool electrode to the workpiece intermediate between said initial period and arrival of the tool electrode at said predetermined position during said consecutive relative advancement.

6. The method defined in claim 1 or claim 5 wherein said parameters include at least one of the pulse interval between successive electrical discharges and the pulse duration and peak current thereof.

7. The method defined in claim 1 or claim 5 wherein said succession of electrical discharges is applied in the form of a succession of time-spaced or intermittently occurring trains of discharge pulses and said parameters include at least one of the peak current and duration of the discharge pulses, the time intervals between said successive trains and the duration of the trains.

8. The method defined in claim 1 wherein said set of NC commands is programmed to execute said consecutive relative advancement between the tool electrode and the workpiece along a predetermined orbital path extending transversely to the axis of the tool electrode.

9. A numerically controlled (NC) electroerosion apparatus for machining an electrically conductive workpiece with a tool electrode, the apparatus comprising:
   power supply means for effecting a succession of electrical discharges across an EDM gap between the tool electrode and the workpiece to electroerosively remove material from the workpiece;
   NC drive means for consecutively advancing the tool electrode relatively into said workpiece under numerical commands from a numerical controller as said material removal proceeds, said commands in a set numerically prescribing a desired path and extent of the relative advancement;
   control means associated with said numerical controller and said power supply means for maintaining electrical parameters of said discharges in a given EDM mode during an initial period of the consecutive advancement of the tool electrode relative to the workpiece;

means in said numerical controller responsive to arrival of the tool electrode at a predetermined position in said path relative to the workpiece spaced by a preselected distance from its final position determined by said numerically prescribed extent of the consecutive relative advancement for switching the parameters of the electrical discharges into another EDM mode and maintaining the switched parameters until the tool electrode reaches said final position relative to said workpiece established in said numerical controller.

10. The apparatus defined in claim 9 wherein the last-mentioned means is associated with said NC drive means to respond to the NC commands representing said arrival.

* * * * *